INVENTOR.
Robert J. Dexter
BY Bialos+Schlemmer
Attorneys

INVENTOR.
Robert J. Dexter
BY Bialos & Schlemmer
Attorneys

INVENTOR.
Robert J. Dexter
BY
Bialos & Schlemmer
Attorneys

United States Patent Office 3,191,456
Patented June 29, 1965

3,191,456
COUNTING CONTROL DEVICE
Robert J. Dexter, Antioch, Calif., assignor to Crown Zellerbach Corporation, San Francisco, Calif., a corporation of Nevada
Filed Apr. 26, 1962, Ser. No. 190,395
11 Claims. (Cl. 74—568)

This invention relates to a control device, and more particularly to a counting control device to be operatively connected with other mechanism for imparting and effecting a control function or functions to such other mechanism.

Still more particularly, this invention relates to a high speed counting control device for sensing the amount of angular displacement of a rotatable shaft and for transmitting a control signal in response to such angular displacement reaching a predetermined value to produce a control result on auxiliary mechanism with which the control device is to be operatively connected. That is, the subject device is to be operatively connected with a rotatable shaft and is operable upon such shaft passing through one complete or a predetermined part of one revolution, or a plurality of complete revolutions, and to thereupon transmit a control signal to another mechanism to which the device is operatively connected for effecting initiation of or cessation of operation of such other mechanism.

The subject counting control device has particular utility when employed in conjunction with a high speed article collating apparatus of the type disclosed in my just filed copending application Serial No. 190,430, filed April 26, 1962, now Patent No. 3,135,175, and entitled "Article Collating Apparatus." However, it should be understood that the subject invention, due to its novel construction and advantageous features as set out hereinafter, may be employed in conjunction with any apparatus upon which it is desired to impart a control or counting function when angular displacement of a rotatable reference shaft reaches a predetermined value.

For purposes of illustration, use of the subject control device will be briefly described with respect to the collating apparatus disclosed in my above mentioned copending application. The subject control device, when thus employed, is designed to respond to a predetermined number of rotations of a rotatable reference shaft to which it is operatively connected and which forms part of such collating apparatus. The subject device senses such shaft having been angularly displaced a predetermined amount and, in response thereto, transmits an electrical control signal to other mechanism of the collating apparatus, such as the gripper assemblies which effect article reorientation during the collating process. To this end the subject device is to be electrically connected to solenoid means interposed between the gripper assemblies and the control device which in turn is adapted to actuate such gripper assemblies in the manner described in said application to effect the control function thereon.

An important feature of the subject counting control device is its long life potential due to the fact that it is, as a result of its novel construction, highly resistant to frictional and other type wear. That is, frictional and other wear is maintained at a minimum with the subject device so that operation thereof over extended periods is possible at extremely high speeds. In this regard, switch structures employed in conjunction with the device are not subjected to short interval repeated actuation, as is true of prior devices, which would unnecessarily shorten the useful life of the switches and necessitate their frequent replacement.

Summarizing this invention, it should be understood that the same relates to a counting control device operable at varying speeds and which is particularly effective at high speeds. To this end, the subject device includes inner and outer movable cam means which are rotatable relative to each other at different speeds. In conjunction with such rotatable inner and outer cam means are cam follower means normally engaged with the outer means but periodically engageable with the inner cam means when such engagement is permitted by the outer cam means during relative rotation of the inner and outer cam means.

Attached to the cam follower means are suitable signal mechanisms for transmitting control signals for effecting control functions upon periodic engagement of the cam follower means with the inner cam means. In the embodiment illustrated, the mechanism connected to the cam follower is of an electrical type adapted to transmit electrical signals. However, in its broader aspects, the invention is applicable with mechanisms attachable to cam follower means which mechanically transmit a control signal and mechanically effect a control function on auxiliary apparatus operatively connected with the control device.

From the foregoing, it should be understood that objects of the present invention include the provision of a counting control device which is responsive to movement of a reference member, such as a rotatable shaft, for effecting a control function in other mechanism upon movement of such reference member through a predetermined given value of movement; the provision in such a control device of counting and control cam means movable relative to each other; the provision in a control device of inner and outer cam means rotatable at different speeds relative to each other and having cam follower means in conjunction therewith engageable with the inner means only upon the outer means being in a predetermined location; and the provision of means in a counting control device for mounting inner and outer cam means for rotation relative to each other at different speeds. These and other objects of the invention will become apparent from a study of the following disclosure in which reference is directed to the attached drawings.

Figures 1, 2:
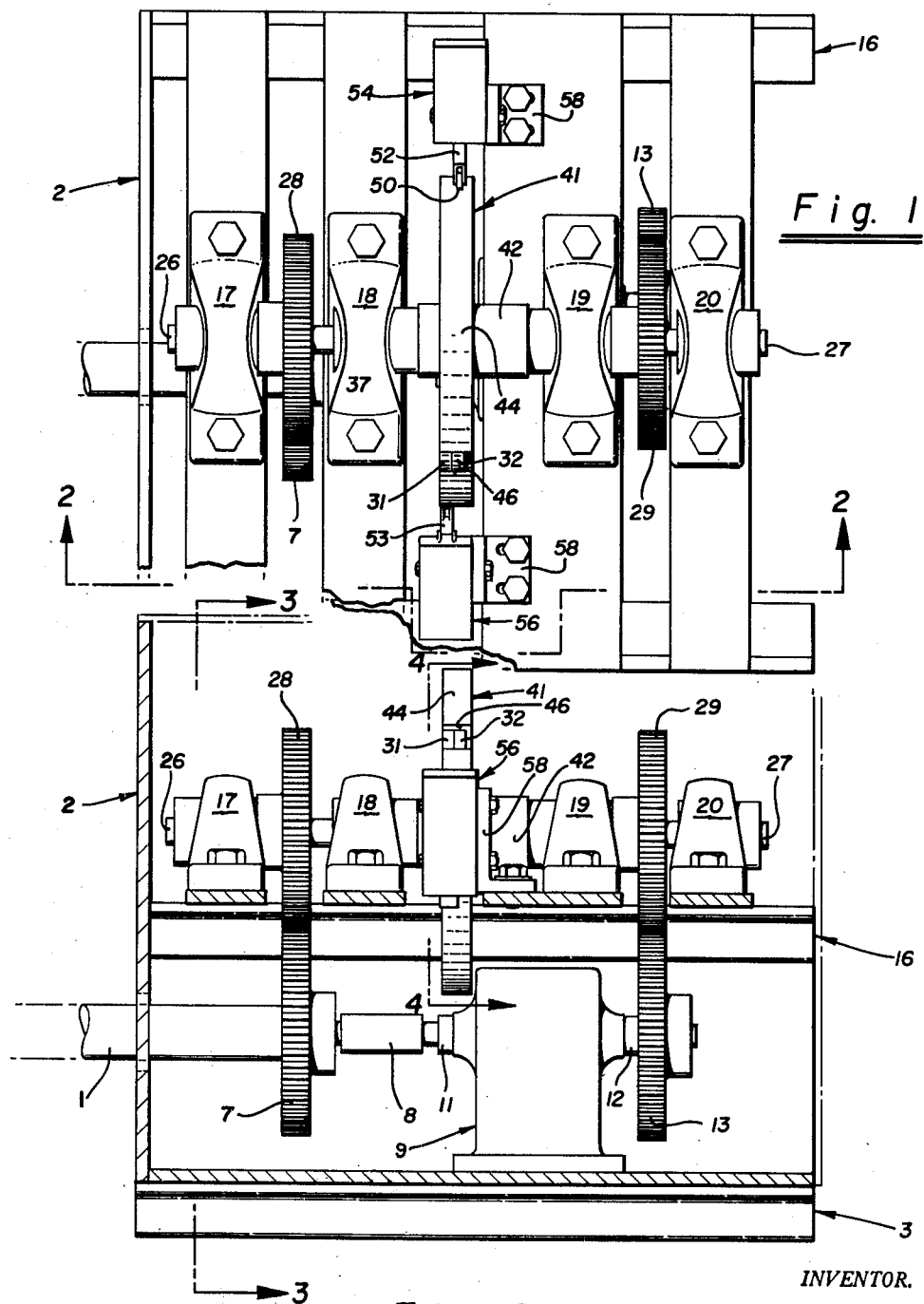
FIG. 1 is a plan view of the subject counting control device.
FIG. 2 is a side elevational view of the subject device taken in the plane of line 2—2 of FIG. 1.

Referring first to FIGS. 1 through 3 and 7, the subject counting control device, when the same is operatively installed in a mechanical installation, is operatively connected with a movable reference member, such as a rotatable drive shaft 1, which is driven by or from any suitable power source (not shown). It is to sense and respond to movement of rotatable shaft 1 through a predetermined degree of angular displacement, whether partial revolutions or a plurality of full revolutions, that the subject invention was devised.

By way of example, when the subject counting device is used in conjunction with a collating apparatus of the type disclosed in my aforementioned copending application, shaft 1 is driven in timed relationship with the remaining operative components of the collating apparatus. The subject device is designed to transmit control signals upon rotation of the shaft 1 through a predetermined amount of angular rotation to solenoids which control operation of the gripper assemblies by means of which the articles being collated may be grasped and reoriented.

The subject control device, generally designated 2 in the drawings, is supported by any suitable framework 3 within an enclosure 4 which includes a removable cover 6 so that access may be gained to the device.

Secured to shaft 1 for rotation therewith is a gear wheel 7. Shaft 1 is connected by a coupler 8 to a gear reduction unit 9 bolted or otherwise suitably secured to the framework 3. Details of construction of the gear reduction unit have not been disclosed in that numerous gear reduction units are commercially available today, all of which are capable of performing their intended function, namely, modifying the output speed of the unit relative to its input speed. That is, in the illustrated embodiment, the speed of rotation applied to input shaft 11 of the unit, to which shaft 1 is connected by coupler 8, is modified by the unit so that the speed of rotation of output shaft 12 of the unit is of a different value. The particular gear reducing unit employed in the subject device is chosen in accordance with the changed speed ratio desired between the output and input shafts 11 and 12 thereof.

Mounted on the output shaft 12 of the gear reducer for rotation therewith is a wheel gear 13. Mounted above the gear reducing unit on an upper framework 16 are a series of spaced pillow blocks or bearing assemblies 17, 18, 19 and 20, each of which is bolted or otherwise suitably secured to transverse frame members of the upper framework.

A mounting idler stub shaft 26 extends between and is journaled for rotation in bearing assemblies 17 and 18, while another idler stub shaft 27 extends between and is journaled for rotation in bearing assemblies 19 and 20. The inner and outer cam means of the subject device are attached to the respective shafts 26 and 27 in the manner to be described for rotation independently of and at different speeds relative to each other.

Mounted on shaft 26 between the bearing assemblies 17 and 18 for rotation with the shaft is a gear wheel 28 which is meshed with and driven by aforementioned gear wheel 7 mounted on drive shaft 1. In this way, shaft 26 is positively driven in direct timed relationship with rotation of shaft 1. Because the gears 7 and 28 are of the same size in the embodiment illustrated, shaft 26 is rotated through one revolution for each revolution of shaft 1. The inner cam means of the device is operatively connected with the end of shaft 26 adjacent bearing assembly 18 for rotation with such shaft in direct timed relationship with rotation of drive shaft 1. Each revolution of shaft 1 effects one revolution of the inner cam means. It should be understood that rotational ratios between the inner cam means and shaft 1 other than 1:1 may be effected as desired by changing the gear ratio of gears 7 and 28.

Shaft 27 has mounted thereon for rotation therewith a gear wheel 29 positioned between bearing assemblies 19 and 20. Gear wheel 29 is meshed with aforementioned gear wheel 13 which is driven by the output shaft 12 of the gear reducing unit 9 at a speed different from the speed of rotation of drive shaft 1. In the embodiment illustrated, gear wheels 13 and 29 are of the same diameter and, accordingly, each revolution of output shaft 12 of the gear reducer unit effects one revolution of shaft 27. The outer cam means mentioned previously is attached adjacent bearing assembly 19 to the end of shaft 27 for rotation therewith.

As with shaft 1 and the inner cam means, the 1:1 rotational ratio between the outer cam means and shaft 12 of the gear reducer may be modified as desired by changing the gear ratio of gears 13 and 29.

From the foregoing it should be understood that, due to the mounting arrangement and gear train employed and the use of gear reducer unit 9, the inner and outer cam means of the subject device are rotatable independently of each other and at different speeds relative to each other so that the intended counting and control function of the device may be effected.

Referring now to FIGS. 4 through 7, the inner cam means secured to rotatable shaft 26 comprises a disc structure including at least one cam disc member having an irregular or eccentric periphery thereon. In the embodiment illustrated, two cam discs 31 and 32 are employed and combine to define the inner cam disc structure. It should be understood, however, that the subject invention, depending upon its intended function and the apparatus with which it is to be used, may employ less than or more than two cam discs as desired.

Figures 4, 5, 6:
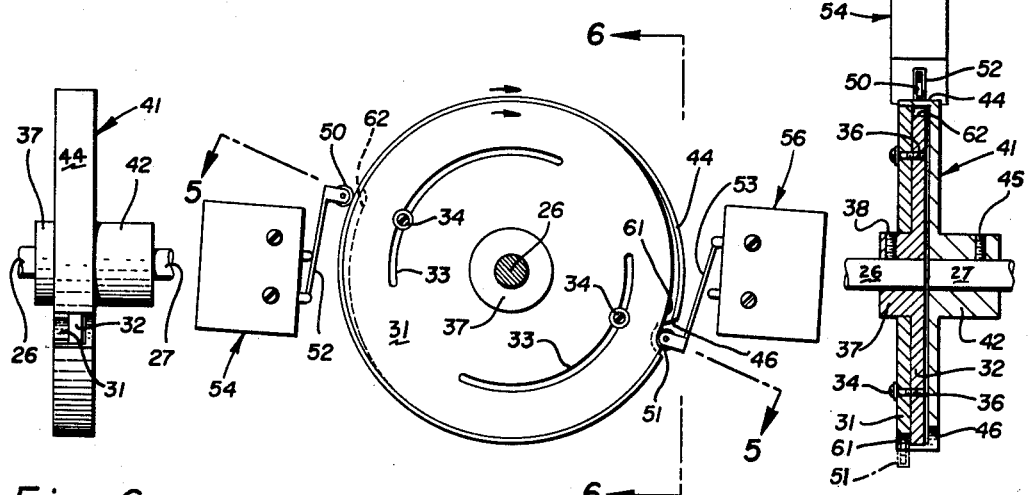
FIG. 4 is a partial vertical sectional view taken in the plane of line 4—4 of FIG. 2 illustrating details of the inner and outer cam means of the device.
FIG. 5 is a sectional view through the cam means of the device taken in the plane of line 5—5 of FIG. 4.
FIG. 6 is an elevational view of the cam means of the device taken in the plane of line 6—6 of FIG. 4.

Preferably, if more than one cam disc is employed as in the embodiment illustrated, the discs are mounted for adjustment relative to each other. In the illustrated embodiment, the adjusting mechanism comprises a pair of arcuate slots 33 in disc 31 through which screw members 34 are receivable. Such screw members in turn are threadedly receivable in threaded bores 36 provided in the other disc 32. Upon loosening screw members 34, disc 31 may be rotated relative to disc 32 to any desired predetermined position for the purpose to be described. To this end, disc 32 is provided with an apertured projecting boss 37 upon which the disc 31 is rotatably and adjustably mounted as seen in FIG. 5. When screws 34 are tightened, the discs are secured together for rotation in unison.

A set screw 38 or equivalent means extends through boss 37 and maintains disc 32 securely connected with shaft 26 for rotation therewith.

The outer cam means comprises a rotatable cam member having a cam surface provided with a recess therealong, and in the form shown such cam member at least partially surrounds and covers the inner cam means and is rotatable relative thereto. In the embodiment illustrated the outer cam means comprises a shell cam member 41 having an apertured boss 42 projecting from one side of a generally circular flat plate 43 which comprises the body thereof. A generally circular ring flange 44 projects from the other side of plate 43 and defines the cam surface of the member 41. As seen in FIG. 5, a set screw 45 or equivalent means projects through boss 42 of the shell cam into engagement with shaft 27 to insure rotation of the shell cam with shaft 27.

As also seen in FIG. 5, the inner cam means and the outer cam means are free of direct contact with each other so as to be relatively rotatable without frictional losses.

Provided in and extending through and across the peripheral flange 44 of the shell cam is at least one recess in the form of a transverse aperture 46 to permit periodic engagement of cam follower means with the inner cam means when the cam follower means is aligned with such aperture. Such cam follower means is employed to function selectively in conjunction with the disc structure of the inner cam means.

In the embodiment illustrated, the cam follower means comprises a pair of rotatable cam followers 50 and 51, each of which is supported on an outwardly spring urged arm 52 and 53, respectively, which are operatively connected with switch means for transmitting a control signal.

In the illustrated embodiment, the cam follower arms project from a pair of electrical microswitches 54 and 56. The microswitches in turn are bolted or otherwise suitably secured to a transverse member of the upper framework 16 in the manner best seen in FIGS. 1, 2 and 3. For this purpose angle brackets 58 are employed.

The respective cam followers 50 and 51 of the respective microswitches are positioned by the arms 52 and 53 in respective alignment with the cam discs 31 and 32 of the inner cam means (see FIG. 5) and are normally urged into engagement with the outer circular periphery of the flange 44 of the shell cam 41. Because the microswitches are fixed relative to the cam means of the device, the cam followers rotate about their respective axes as they ridingly engage the flange of the shell cam as the shell cam is rotated by shaft 27.

Normally, because shell cam flange 44 is continuous for most of its peripheral extent, the cam followers are maintained out of engagement with the inner cam discs 31 and 32 respectively aligned therewith. However, periodic engagement of each cam follower with its associated cam disc is possible when the aperture 46 of the rotating shell cam 41 is aligned with a cam follower as seen in FIG. 4.

Figure 3:
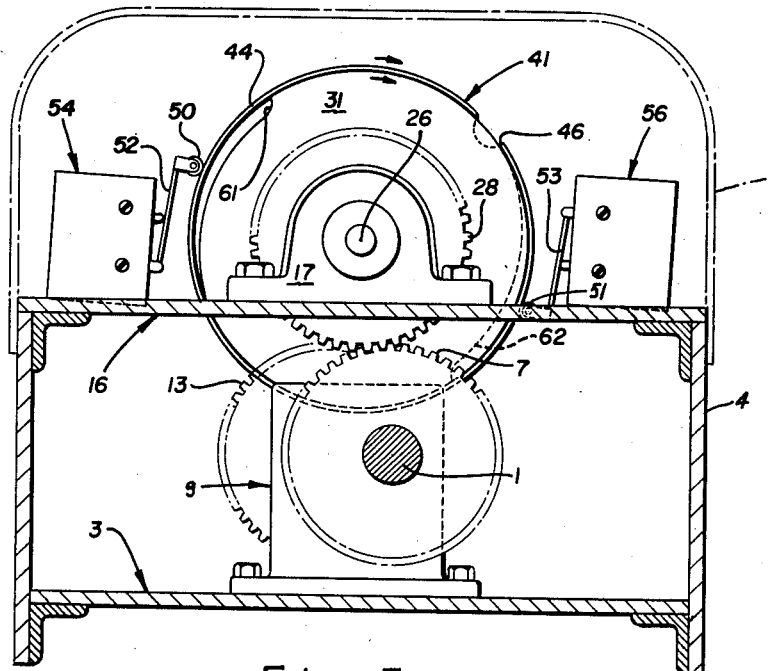
FIG. 3 is a vertical sectional view taken in the plane of line 3—3 of FIG. 2.
Figure 7:
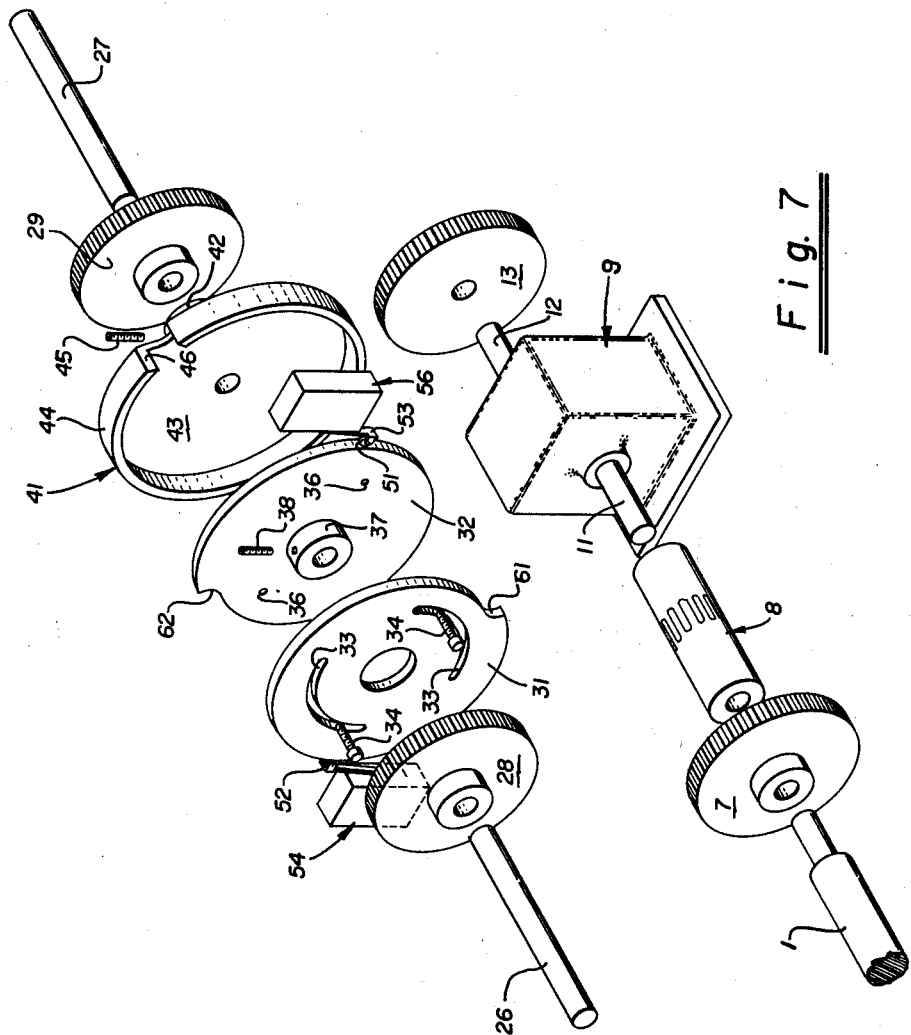
FIG. 7 is an exploded view of the device illustrating details of the respective components thereof and showing their relationship to each other.

As best seen in FIGS. 3, 4 and 7, each of the inner cam discs is provided with an irregular or eccentric periphery which is defined by a generally circular portion and a relieved camming portion. Disc 31 is provided on its periphery with a reduced diameter relieved portion 61 which extends into the disc from a predetermined point on its generally circular periphery to provide an abrupt shoulder portion. The relieved portion 61 as seen in FIG. 3 is of lesser diameter than the maximum diameter of the disc. For the purpose to be described, preferably the relieved camming portion 61 tapers from its abrupt shoulder towards the periphery of the disc until it blends with the circular portion of such periphery.

The other disc 32 also is provided with a tapered relieved camming portion 62 preferably substantially identical with the camming portion of disc 31. See FIG. 4.

As noted previously, cam followers 50 and 51 normally are held out of engagement with the inner cam discs by the flange 44 of the shell cam on which the cam followers ride. However, when the shell cam is rotated by shaft 27 to a position so that the aperture 46 in the flange thereof is aligned with a cam follower, under the urging of its spring actuated arm such cam follower is let into engagement with its associated cam disc which is rotating within the shell cam. The relative positions of a cam follower which is engaged with its associated disc, while the other cam follower is maintained out of engagement with its associated disc is shown in FIGS. 4 and 5 in which the respective cam means are mounted for clockwise rotation.

When a cam follower is let into engagement with its associated cam disc, the microswitch to which the cam follower is operatively connected is actuated by the cam follower when the follower is engaged with the reduced diameter relieved camming portion of its associated cam disc. However, it should be understood that, with the illustrated embodiment, unless the relieved portion of the cam disc is aligned with the aperture 46 in the shell cam when the cam follower is let into the aperture, no signal will be transmitted by the switch. That is, if the cam follower is only in contact with the circular portion of the periphery of its associated cam disc, the switch will not be actuated. This is due to the fact that the microswitches employed are designed so that the cam follower must move through a distance equal to the combined distance from the outer periphery of the shell cam flange 44 to the inner or minor diameter defined by the reduced diameter relieved portion of a cam disc. That is, the throw of each switch is gauged to the difference between the maximum dimension of the shell cam and the minimum dimension of the cam discs.

From the foregoing, it should be understood that the subject device is adapted to transmit control signals in any given predetermined sequence upon the drive shaft 1 having rotated through any given degree of angular displacement. In the embodiment illustrated, the cam discs 31 and 32 are adjustably arranged so that the abrupt shoulders of the eccentric relieved camming portions 61 and 62 are located 180° apart. Thus, two signals can be transmitted during each revolution of shell cam 41 (assuming an appropriate relative rate of rotation between the cam discs 31–32 and the cam member 41, say for example, a 2:1 ratio) and the same time interval will then elapse between such signals.

However, by modifying the position of adjustment between the two cams discs relative to the cam followers and with correspondingly appropriate relative rates of rotation of the cam discs and cam member, other desired timing arrangements may be obtained. For example, by setting the shoulders of the relieved camming portions of the cam discs so that they are 90° removed from each other in one circular direction and 270° removed in the other direction, the control signals transmitted by the two microswitches may be modified (assuming appropriate corresponding relative rates of rotation between the cam discs and cam member) so that other time intervals between control functions effected by such signals may be produced.

While in the embodiment illustrated, modified timing sequences as described can be obtained by adjusting the positions of the cam discs relative to each other, it should be understood that similar results could be obtained by securing the cam discs relative to each other and by mounting the microswitches and their associated cam folowers for adjustment relative to each other and relative to the shell cam 41.

With the embodiment illustrated, it should be understood that each microswitch is activated only once during each revolution of the shell cam 41 because only one aperture is provided in the shell cam flange. However, by providing more than one aperture in the flange 44, each microswitch could be actuated more than once during each revolution of the shell cam, if so desired. Because each microswitch is activated only infrequently during rotation of the shell cam, wear and tear on the microswitches is greatly reduced and long life therefor is insured. The shell cam desirably is rotated at a relatively slow speed with respect to the speed of rotation of the inner cam discs 31 and 32. This reduces wear on the shell cam and on the cam followers and further enhances the life of the control components of the device.

By way of example, if the subject device, as illustrated, is operatively connected with a bag collating apparatus of the type described in my aforementioned application in which the collating apparatus is scheduled to collate fifty bags in each of alternate groups, a gear reduction unit 9 set for a 100:1 gear reduction may be employed with the subject device. Shaft 1 and, therefore, cam discs 31 and 32 are making one revolution for each bag fed to the collating apparatus. Because the cam followers 50 and 51 are oriented 180° apart, as are the relieved camming portions of the respective cam discs, during each 180° of revolution of the shell cam (i.e., each 50 revolutions of the cam discs 32 and 31), one of the cam followers is let into engagement with its associated disc.

Each time a cam follower is sequentially let into engagement with its associated disc, (each one-half revolution of shell cam 41 and each 50 revolutions of the cam discs 31 and 32) its associated microswitch is actuated to effect a signal transmission to a gripper assembly of the associated collating apparatus. This results in the bags being grouped in alternate series of 50 bags each. By way of further example, if it were desired to orient twenty-five bags in each group collated, a 50:1 gear reduction unit could be employed in the subject control device.

It should further be understood that by proper positioning of the cam followers relative to each other and relative to the camming portions of the cam discs, by increasing or decreasing the number of cam followers and microswitches employed therewith, or by modifying the speed ratios between the respective cam means, substantially any control arrangement or timing sequence desired may be employed. In this regard, by widening the peripheral flange 44 of the shell cam, and by providing additional cam followers an dinner cam discs, additional control signals could be transmitted by the device. A large number of control functions are performable by a device embodying this invention to meet substantially any control need merely by tailoring a device of the type illustrated for a particular job.

Because, as noted perviously, the outer shell cam is rotating relatively slowly, frictional wear and actuation wear on the microswitches and cam followers is reduced appreciably over prior art devices. In this regard, by way of example, if the drive shaft 1, to which the control device is operatively connected, is rotating at a high speed of 500 r.p.m., and if a 100:1 gear reduction unit 9 is employed, the outer shell cam is rotating at only 5 r.p.m. while the inner cam discs directly driven from the drive shaft 1 are rotating at 500 r.p.m.

Because the subject device is designed for high speed operation, it has been found desirable to employ an elongated eccentric relieved camming portion on each of the cam discs so that each cam follower will be assured of dropping into contact with the relieved portion of the cam disc during high speed rotation of the cam. That is, while a relatively small aperture 46 may be effectively employed in the shell cam flange because of the normally low speed of rotation of the shell cam, a larger camming portion is required on the cam discs due to the high speeds at which the inner cam discs are intended to rotate. That is, to give the cam follower ample opportunity to travel its full throw or stroke before it is again cammed outwardly, an elongated relieved portion is required in the high speed disc structure. The exact length of the relieved portion in the discs and of the aperture in the shell cam may be varied and will be determined to a large extent by the speeds at which the inner and outer cam means are designed to rotate.

Because the contact of the cam follower with the relieved portion of its associated cam disc is momentary, the microswitches chosen preferably are of a type which are responsive to momentary actuation for transmitting their respective signals. Because of this momentary actuation, very precise timing is possible with the subject device.

The microswitches in the illustrated embodiment are wired normally closed but are held open by engagement of the cam followers with the shell cam 41. The circuits from the switches are allowed to close when each cam follower drops momentarily into engagement with an inner cam disc through the aperture 46 in the shell cam.

From the foregoing, it should be understood that this invention relates to a high speed counting and control device which minimizes wear on the respective components thereof, and which is capable of sensing and transmitting signals or mechanical motion from the control device to auxiliary mechanism in response to movement of a reference member, such as a rotatable shaft, through a predetermined degree of motion. When the device is operatively connected with a rotatable shaft, the device may be employed by proper location of the microswitch cam followers relative to camming portions on the inner cam means to perform its intended control function when the shaft has rotated through any predetermined number of revolutions or through any degree of a single revolution. Similarly, although the invention has been illustrated in an embodiment employing a disc structure having two camming portions for actuating two cooperable switches, other arrangements also are contemplated within the scope of this invention.

Having thus made a full disclosure of this invention, attention is directed to the appended claims. Modifications to this invention, which may become apparent to one skilled in the art after reference has been taken to this disclosure, are contemplated as falling within the scope of the appended claims.

I claim:

1. A control device for effecting control functions in response to predetermined angular displacements of a shaft to which said device is operatively connectable; comprising frame structure, a cam member rotatably supported by said frame structure and having a cam surface provided with a recess therealong, cam disc structure rotatably supported by said frame structure adjacent said cam member and having a pair of spaced apart camming portions therealong, means operatively connected with said cam member and with said cam disc structure for rotating each at a velocity different from that of the other to effect relative rotation therebetween in response to angular displacements of such shaft, a pair of cam followers rotationally fixed relative to said cam member and cam disc structure and being oriented and located in alignment both with said cam surface so as normally to ride thereon and also with said cam disc structure for engagement with the camming portions thereof and being respectively periodically projectable into said recess as said cam member rotates to engage said cam disc structure and thereby enable engagement with any camming portion thereof then in angular alignment with said recess, and control means operatively connected with said cam followers for providing control response to engagement of the respective cam followers with any camming portion of said cam disc structure during such relative rotation of said cam member and said cam disc structure.

2. A control device for effecting control functions in response to predetermined angular displacements of a shaft to which said device is operatively connectable; comprising frame structure, a cam member rotatably supported by said frame structure and having a cam surface provided with a recess therealong, cam disc structure rotatably supported by said frame structure adjacent said cam member and having a pair of spaced apart camming portions therealong, means operatively connected with said cam member and with said cam disc structure for rotating each at a velocity different from that of the other to effect relative rotation therebetween in response to angular displacements of such shaft, a pair of cam followers rotationally fixed relative to said cam member and cam disc structure and being oriented and located for engagement with said cam surface so as normally to ride thereon and also being respectively aligned with said camming portions for engagement therewith and being respectively periodically projectable into said recess as said cam member rotates to enable engagement with the respectively associated camming portions if then in angular alignment with said recess, and control means operatively connected with said cam followers for providing control response to engagement of the respective cam followers with any camming portion of said cam disc structure during such relative rotation of said cam member and said cam disc structure.

3. The control device of claim 2 in which said camming portions are spaced apart laterally and in which said cam followers are laterally spaced apart in respective alignment with said camming portions.

4. The control device of claim 3 in which said cam member is provided with a laterally extending annular flange disposed in circumjacent relation with said cam disc structure, and in which said recess constitutes an aperture in said flange.

5. The control device of claim 3 in which said cam disc structure comprises a pair of cam discs each of which provides one of said camming portions.

6. The control device of claim 5 and further including adjustment mechanism connecting said pair of cam discs for rotation thereof in unison, said adjustment mechanism being operable to enable relative angular adjustments of said pair of cam discs for selectively establishing the relative orientation of said camming portions thereof.

7. The control device of claim 3 in which said camming portions are angularly spaced.

8. The control device of claim 2 in which said control means comprises a pair of electrical switch structures respectively connected with said cam followers.

9. A control device for effecting control functions in response to predetermined angular displacements of a shaft to which said device is operatively connectable; comprising frame structure, a cam member rotatably supported by said frame structure and having a cam surface provided with a recess therealong, cam disc structure rotatably supported by said frame structure adjacent said cam member and having a camming portion therealong, means operatively connected with said cam member and with said cam disc structure for rotating each at a velocity different from that of the other to effect relative rotation therebetween in response to angular displacements of such shaft, a pair of cam followers rotationally fixed relative to said cam member and cam disc structure and being oriented and located in alignment both with said cam surface so as normally to ride thereon and also with said cam disc structure for engagement with the camming portion thereof and being respectively periodically projectable into said recess as said cam member rotates to engage said cam disc structure and thereby enable engagement with the camming portion thereof if such camming portion is then in angular alignment with said recess, control means operatively connected with said cam followers for providing control response to engagement of the respective cam followers with the camming portion of said cam disc structure during such relative rotation of said cam member and said disc structure.

10. A control device for effecting control functions in response to predetermined angular displacements of a shaft to which said device is operatively connectable; comprising frame structure, a cam member rotatably supported by said frame structure and having a cam surface provided with a recess therealong, cam disc structure rotatably supported by said frame structure adjacent said cam member and having a pair of spaced apart camming portions therealong, means operatively connected with said cam member and with said cam disc structure for rotating each at a velocity different from that of the other to effect relative rotation therebetween in response to angular displacements of such shaft, cam follower structure rotationally fixed relative to said cam member and cam disc structure and being oriented and located in alignment both with said cam surface so as normally to ride thereon and also with said cam disc structure for engagement with the camming portions thereof and being periodically projectable into said recess as said cam member rotates to engage said cam disc structure and thereby enable engagement with any camming portion thereof then in angular alignment with said recess, and control means operatively connected with said cam follower structure for providing control response to engagement thereof with any camming portion of said cam disc structure during such relative rotation of said cam member and said cam disc structure.

11. A control device for effecting control functions in response to predetermined angular displacements of a shaft to which said device is operatively connectable; comprising frame structure, a cam member rotatably supported by said frame structure and having a cam surface provided with a recess therealong, cam disc structure rotatably supported by said frame structure adjacent said cam member and having a camming portion therealong, means operatively connected with said cam member and with said cam disc structure for rotating each at a velocity different from that of the other to effect relative rotation therebetween in response to angular displacements of such shaft, cam follower structure rotationally fixed relative to said cam member and cam disc structure and being oriented and located in alignment both with said cam surface so as normally to ride thereon and also with said cam disc structure for engagement with the camming portion thereof and being periodically projectable into said recess as said cam member rotates to engage said cam disc structure and thereby enable engagement with the camming portion thereof if such camming portion is then in angular alignment with said recess, and control means operatively connected with said cam follower structure for providing control response to engagement thereof with the camming portion of said cam disc structure during such relative rotation of said cam member and said cam disc structure.

References Cited by the Examiner

UNITED STATES PATENTS 2,451,416  10/48  Thomas _____ 74—125.5

FOREIGN PATENTS 612,029  4/35  Germany.
910,861  5/54  Germany.

BROUGHTON G. DURHAM, *Primary Examiner.*